United States Patent
Pittard et al.

[11] Patent Number: 6,113,024
[45] Date of Patent: Sep. 5, 2000

[54] WINDING WEDGE RETENTION TO MAINTAIN COIL FORM

[75] Inventors: Glenn C. Pittard, Chandler, Ariz.; Scott A. Jacobs, Old Bridge, N.J.

[73] Assignee: AlliedSignal Inc., Morristown, N.J.

[21] Appl. No.: 09/337,937

[22] Filed: Jun. 22, 1999

Related U.S. Application Data

[60] Provisional application No. 60/131,791, Apr. 30, 1999.

[51] Int. Cl.[7] ................................................. H02K 15/09
[52] U.S. Cl. .............................. 242/433; 310/61; 310/214
[58] Field of Search ................................. 242/433, 433.4, 242/448; 310/61, 59, 64, 214, 261, 269

[56] References Cited

U.S. PATENT DOCUMENTS

| | | | |
|---|---|---|---|
| 829,801 | 8/1906 | Pratt et al. | 242/433 X |
| 3,008,786 | 11/1961 | Costello | 310/214 |
| 4,409,502 | 10/1983 | VcCabria | 310/61 |
| 4,572,980 | 2/1986 | Anderson et al. | 310/214 |
| 4,584,497 | 4/1986 | Butman, Jr. et al. | 310/214 |
| 4,728,840 | 3/1988 | Newhouse | 310/54 |
| 4,943,746 | 7/1990 | Scherzinger et al. | 310/61 |
| 5,140,204 | 8/1992 | Cashmore et al. | 310/61 |

*Primary Examiner*—Donald P. Walsh
*Assistant Examiner*—Emmanuel M. Marcelo
*Attorney, Agent, or Firm*—William J. Zak, Jr., Esq.

[57] ABSTRACT

A winding wedge retention system designed to maintain coil form includes a rotor (21) having a plurality of rotor poles (24), a coil (20) wound on one of the rotor poles (24), a V-shaped support wedge (22) positioned between adjacent rotor poles (24, 24) and that is adapted to support the coil (20), and a second wedge (26) that is positioned between and adjacent to the coil (20) and the rotor pole (24) on which the coil (20) is wound. The second wedge (26), in the presence of centrifugal loads, maintains a constant shape of the coil (20) and also maintains a constant position of the coil (20) relative to a position of the support wedge (22). A winding wedge retention system for the entire rotor includes, in addition to the rotor (21) itself and coils (20) wound on each of the rotor poles (24), plural V-shaped support wedges (22) positioned between each adjacent pair of rotor poles (24) and plural dove-tail shaped wedges (26) that are positioned between and adjacent to each of the coils (20) and rotor poles (24). The dove-tail wedges (26) are adapted to move toward the adjacent supports (22) in the presence of centrifugal loads thus maintaining a constant shape and position of the coils (20) relative to the position of the support wedges (22).

6 Claims, 4 Drawing Sheets

WINDING WEDGE RETENTION TO MAINTAIN COIL FORM

This patent application claims priority upon U.S. provisional patent application Ser. No. 60/131,791, filed Apr. 30, 1999.

GOVERNMENT RIGHTS

This invention was made with Government support under Agreement No. MDA972-94-2-0003 awarded by ARPA. The Government may have certain rights in the invention.

BACKGROUND

A) Field of Invention

The present invention relates to winding wedge retention, and more particularly, to a coil winding retention scheme within a generator rotor to maintain coil form during high speed rotation.

B) Description of Related Art

Typical wound generator rotors use a center wedge to retain the copper coil (winding) in the rotor slot. The center wedge generally is held in place by one of different techniques. One technique provides for retaining the wedge itself under the pole tips, utilizing several different wedges to accomplish this. A second technique, which is more commonly utilized in designs that have conduction cooling through their so-called cooling wedges, provides for holding the cooling wedges in place by rotor end bands, such as schematically shown in FIG. 1 of the drawings.

Referring to FIG. 1, cooling wedge 12 retains winding (coil) 10 in place and itself is held in place by rotor end bands (not shown). Rotor pole tips 14 do not hold cooling wedge 12 in place in this coil retention scheme. Cooling wedges are discussed in various references including U.S. Pat. No. 4,943,746, which is incorporated herein by reference.

In typical coil retention schemes, impregnation is used to minimize relative motion of the coil to itself as well as the adjoining parts. During relatively low tip speeds and in rotors with small diameters, impregnation in combination with current designs provides for acceptable coil retention. However, in rotors with large diameters (e.g. 12 inch) and/or in high tip speed machines, such as required in certain train applications operating, for example, at 15,000 revolutions per minute, centrifugal loads that are experienced during operation cause the coils and wedges to move outwards radially from the rotor center despite the coil retention schemes. Coil and wedge movement, in turn, disadvantageously results in nonuniform deformation of the coils themselves. As rotor diameter increases, movement and deformation pronouncedly increases.

Coil movement may lead to fretting and/or wear of the coil insulation which would result in electrical failure. Electrical failure damage rotor performance. This phenomenon is cyclical and its frequency is generally dependent on the number of accelerations/decelerations cycles, as well as, the number of thermal cycles.

FIG. 2 is a schematic illustration of the relative positions of coil 10 and cooling wedge 12 during high speed rotation (i.e., a large centrifugal load). As shown in FIG. 2, location 1 identifies an initial point of concern involving the interface of the coil with the cooling wedge. The area identified is affected due to the non-uniform movement of the coil. A portion of the coil losses contact with the cooling wedge resulting in a reduction in heat management which in turn leads to hot spots. Hot spots in turn result in eventual failure of the device. Location 2 depicts the deformation between the coils themselves. The resulting wear on the coils may lead to insulation breakdown and hence reduced life of the rotor.

OBJECTS AND SUMMARY OF THE INVENTION

It is therefore an object of the present invention to provide a winding wedge retention technique that overcomes the above-mentioned shortcomings of current techniques. It is another object of the invention to provide a winding wedge retention scheme that maintains coil form during high speed rotation of the rotor.

It is a further object of the invention to provide a winding wedge retention scheme that maintains coil and wedge contact during high centrifugal loads.

It is an additional object of the invention to provide a winding wedge retention scheme that minimizes coil movement relative to itself.

It is yet another object of the invention to provide a winding wedge retention scheme that eliminates or at least minimizes coil insulation breakdown that otherwise would occur as a result of extended and/or high speed rotation of the rotor.

Various other objects, advantages and features of the present invention will become readily apparent to those of ordinary skill in the art, and the novel features will be particularly pointed out in the appended claims.

In accordance with an embodiment of the present invention, a winding wedge retention system includes a rotor having a plurality of rotor poles, a coil wound on one (or each) of the rotor poles, a V-shaped support wedge positioned between adjacent rotor poles and that is adapted to support the coil, and a second wedge that is positioned between and adjacent to the coil and the rotor pole on which the coil is wound.

As an aspect of the present invention, the second wedge is positioned radially outwards from the coil with respect to a center of the rotor.

As another aspect of the present invention, a portion of the second wedge is in contact with the support wedge.

As a further aspect of the present invention, the rotor pole extends toward the support wedge and forms an acute angle between a radially outward end of the coil and a radially inward surface of the rotor pole.

As a feature of this aspect, the second wedge is positioned within a gap defined by the acute angle formed between the coil and the rotor pole.

As another feature of this aspect, the second wedge has a structure that results in the radially outward surface of the second wedge being in contact with the radially inward surface of the rotor pole, and also that results in the radially inward surface of the second wedge being in contact with the coil.

As a feature, the radially outward and radially inward surfaces of the second wedge form an acute angle that is substantially the same as the acute angle that is formed between the coil and the rotor pole.

As an additional aspect of the invention, the second wedge is adapted to be in contact with the coil and the rotor pole in the presence of centrifugal loads.

As yet a further aspect of the invention, the second wedge is adapted to move both radially outward with respect to a center of the rotor and towards the support wedge in the presence of centrifugal loads.

As yet an additional aspect of the invention, the system, as in typical rotors, further includes a second coil wound on the other rotor pole that is adjacent to the above-mentioned support wedge, but in accordance with the invention, a third wedge is positioned between and adjacent to the second coil and the second rotor pole.

As a feature of this aspect, the second and third wedges are both adapted to simultaneously move, in the presence of centrifugal loads, radially outward with respect to a center of the rotor and towards one another.

As still yet a further aspect, the second wedge is adapted to maintain a constant shape of the coil in the presence of varying centrifugal loads.

As still yet an additional aspect, the second wedge is adapted to maintain a constant position of the coil relative to a position of the support wedge in the presence of varying centrifugal loads.

In accordance with another embodiment of the present invention, and more specific to the entire rotor, a winding wedge retention system includes a rotor having a plurality of rotor poles, a plurality of coils each wound on a respective one of the rotor poles, a plurality of V-shaped support wedges positioned between each adjacent pair of rotor poles, wherein the support wedges are adapted to support each of the coils, and a plurality of dove-tail shaped wedges positioned between and adjacent to each of the coils and a respective rotor pole on which the each of the coils is wound.

As an aspect of this embodiment, each of the dove-tail shaped wedges is positioned radially outwards from the respective adjacent coil with respect to a center of the rotor.

As a further aspect of this embodiment, the dove-tail shaped wedges are adapted to move both radially outward and towards the respective support wedge that supports the coil to which the respective dove-tail shaped wedge is adjacent.

As a another aspect of this embodiment, each of the dove-tail shaped wedges is adapted, in the presence of varying centrifugal loads, to maintain a constant shape of the coil to which the respective dove-tail shaped wedge is adjacent.

As yet a further aspect of this embodiment, each of the dove-tail shaped wedges is adapted, in the presence of varying centrifugal loads, to maintain a constant position relative to a position of the respective adjacent support wedge of the coil to which the respective dove-tail shaped wedge is adjacent.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Figure 3:
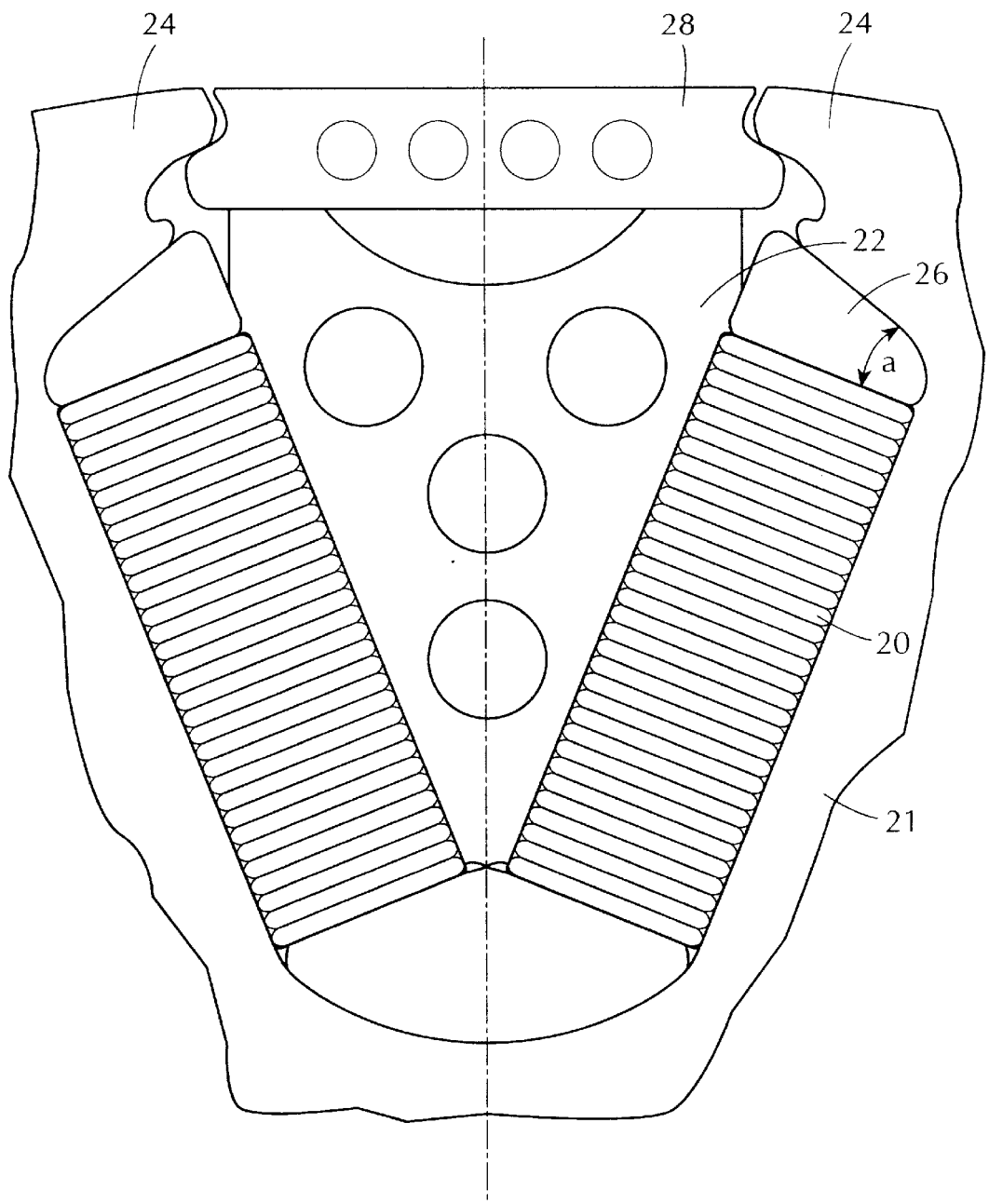
FIG. 3 is a schematic illustration of the coil retention system of the present invention, shown in a static state.

FIG. 3 schematically illustrates the coil (winding) retention system or scheme of the present invention. FIG. 3 illustrates and shows only a portion of a rotor 21 having a plurality of poles 24. As is well known, rotors typically include a plurality of poles, each of which is wound with coil conductors, called windings. For purposes of convenience, a single V-shaped cooling wedge positioned between two adjacent rotor poles is discussed. However, it will be understood that every rotor pole with the associated windings and wedges may embody the present invention.

As shown in FIG. 3, a coil winding 20 is retained by a V-shaped cooling wedge 22 and a dove tail-shaped wedge 26. For purposes of the present invention, wedge 22 is identified as a cooling wedge, such as disclosed in the above-mentioned U.S. Pat. No. 4,943,746. However, various rotors may not utilize its wedges for cooling purposes. Thus, the present invention is not limited to the utilization of cooling wedges and may easily utilize other types of support wedges that retain coil windings within the rotor 21.

As will be appreciated, dove tail wedge 26 is utilized to maintain the shape of coil 20 and to ensure that the coil is properly loaded against cooling wedge 22 during operation. In accordance with the present invention, dove tail wedge 26 introduces an acute angle (shown as "a") between the radially outward end of coil 20 and the radially inward surface of the tip of rotor pole 24. During assembly of the rotor 21, dove tail wedge 26 is inserted into the gap extending between coil 20 and rotor pole 24. Dove tail wedge 26 is positioned radially outwards from coil 20 from the core center. Since dove tail wedge 26 provides an acute angle "a" at its end opposite to cooling wedge 22, an outwardly radial force on dove tail wedge 26 results in dove tail wedge movement inwards towards cooling wedge 22. Acute angle "a" is shown to be approximately 20°, but other angles may be suitable. The movement of the coil and wedges during rotation of the rotor 21 is further discussed below with reference to FIG. 4.

Similar to existing devices, cooling wedge 22 is held in place by a top wedge 28. Since the use of rotor end bands to maintain cooling wedges or other support wedges is well known in the art, further discussion thereof is omitted herein except where necessary for an understanding of the present invention.

Figure 1:
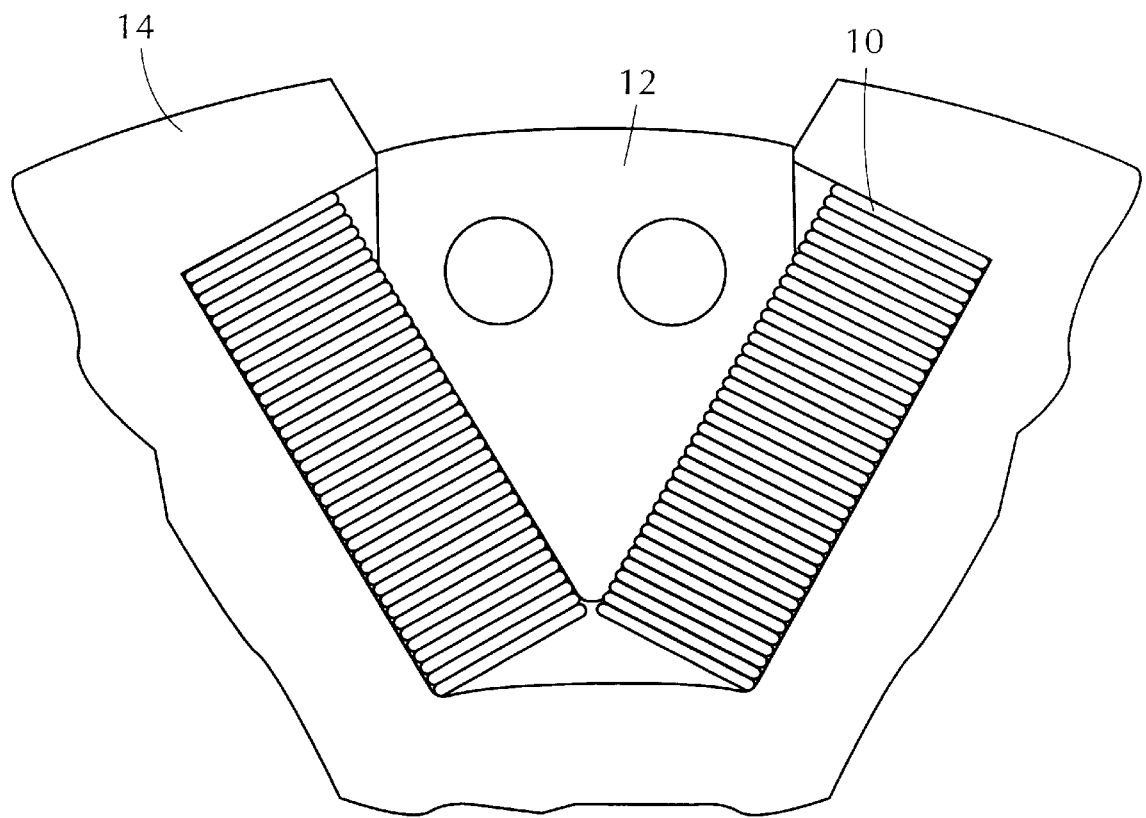
FIG. 1 is a schematic illustration of a conventional coil retention system shown in a static state.
Figure 2:
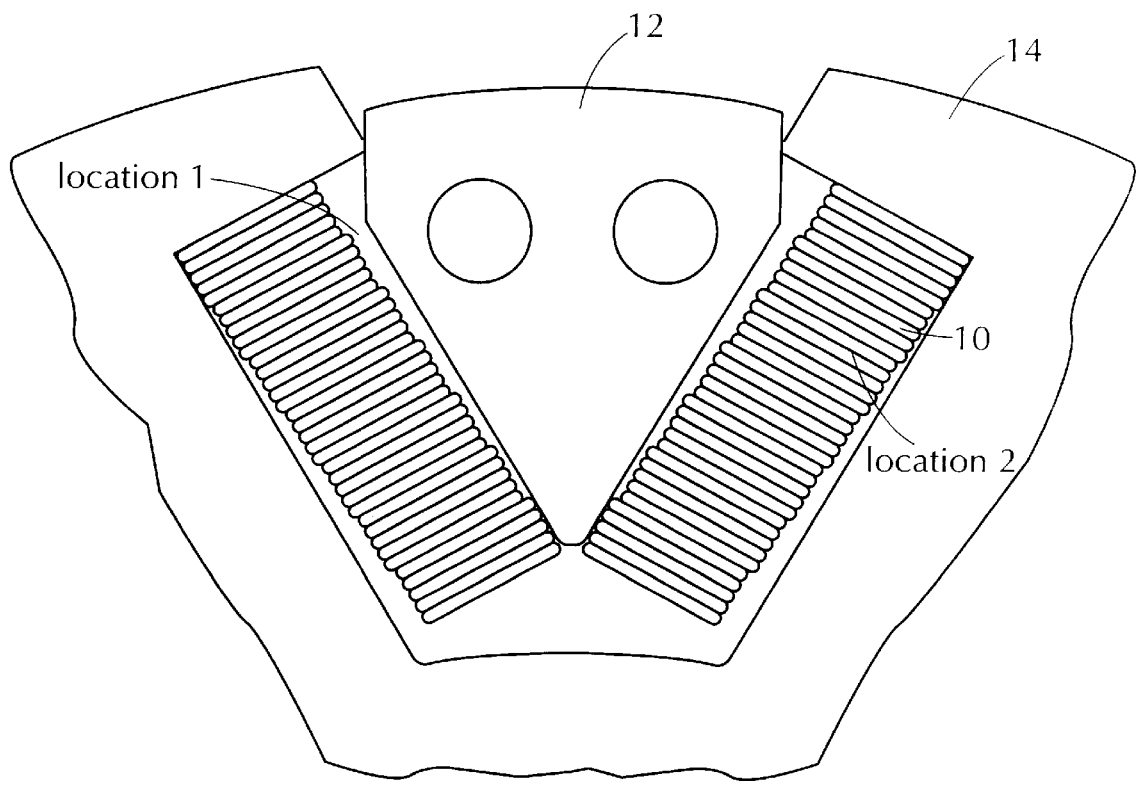
FIG. 2 is a schematic illustration of the coil retention system shown in FIG. 1 during operation (i.e., rotation) of the rotor.

During high speed rotation of the rotor 21, the resultant large centrifugal load upon the rotor elements causes all of the elements to move outward radially from the center of the core. In rotors with small diameters and during low rotation speeds, the tips of a rotor pole generally move only slightly or not at all. However, at sufficient centrifugal loads (resulting from high speed rotation or large diameter rotors), the tips 24 move sufficiently outward to substantially impact previous designs as discussed above. As shown in FIG. 2 with respect to previous designs, the movement of the cooling wedge, coils and rotor tips undesirably creates a gap between the coils and the cooling wedge and also undesirably results in movement with the coil themselves, represented in FIG. 2 by the stepped windings.

In accordance with the present invention with reference again to FIG. 3, the shape of dove tail wedge 26 in combination with the particular shape of the radially inward surface of the tip of rotor pole 24 (i.e., forming angle "a") results in dove tail wedge 26 and adjacent coil 20 to simultaneously move radially outward and toward cooling wedge 22. The relative positions of coil 20, cooling wedge 22, dove tail wedge 26 and rotor pole 24 during high centrifugal loads is schematically shown in FIG. 4.

Figure 4:
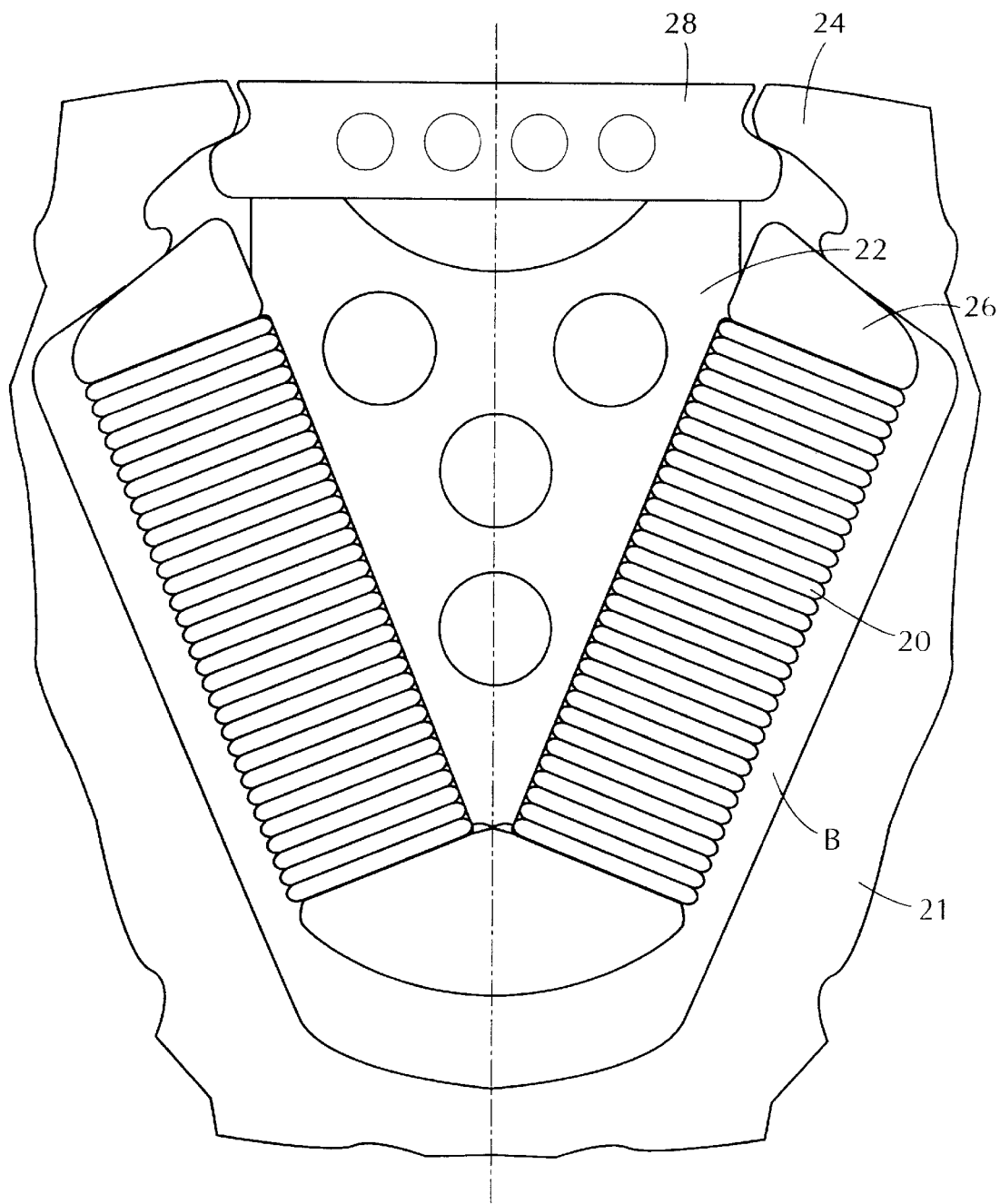
FIG. 4 is a schematic illustration of the coil retention system shown in FIG. 3 of the present invention during rotation of the rotor.

As shown in FIG. 4, cooling wedge 22 has moved outward radially away from the center, whereas dove tail wedge 26 and coil 20 have moved both outward and toward cooling wedge 22, thereby maintaining continuous contact between cooling wedge 22 and coil 20. In addition, dove tail edge 26 maintains an even pressure on the coil stack thus minimizing deformation of the coils (i.e. coil movement relative to itself). The resultant gap that forms due to high centrifugal loads is shown as area "B" in FIG. 4. Area "B" of FIG. 4 is distinctly different from the gap shown in FIG. 2 relating to previous designs. This distinction is important in that it represents the different positions of the turns of the coil in the different designs in the presence of high centrifugal loads. In FIG. 2, the gap is non-uniform, wherein the gap adjacent to the coil decreases as the coil extends radially outwards. The non-uniform gap results in coil turn displacement with respect to adjacent coil turns and also results in non-contact between portions of the coil and the cooling wedge. In contrast to the gap shown in FIG. 2, gap "B" shown in FIG. 4 of the present design is uniform throughout the entire the coil. Thus, the turns of coil 20 do not move relative to one another and the entire coil remains in contact with cooling wedge 22.

From the going description of the present invention, it is seen that various advantages are realized by the utilization of dove tail wedges having the particular structure shown. These advantages include maintaining coil form during both low and high speed rotation of the rotor, maintaining coil and wedge contact during both low and high centrifugal loads, minimizing coil movement relative to itself during operation of high speed rotors, and minimizing coil insulation breakdown that may otherwise occur as a result of extended and/or high speed rotation of the rotor. Insulation breakdown occurs, within existing devices, between the coil turns and also between the edges of the windings and the cooling wedges. The winding wedge retention scheme of the present invention substantially reduces such insulation breakdown by ensuring that coil shape and coil position relative to the cooling wedge remains constant.

While the present invention has been particularly shown and described in conjunction with a preferred embodiment thereof, it will be readily appreciated by those of ordinary skill in the art that various changes may be made without departing from the spirit and scope of the invention. For example, the present invention has been described as including a single dove tail adjacent to each coil winding. However, the present invention is not limited to this particular construction and may be applied to the utilization of multiple components in place of the illustrated dove tail so long as the intended result is achieved.

As another example, although the present discussion is directed to rotors having cooling wedges, the present invention is not limited solely to these types of rotors and may be widely applied to other rotors that do not include cooling wedges.

Therefore, it is intended that the appended claims be interpreted as including the embodiments described herein, the alternatives mentioned above, and all equivalents thereto.

What is claimed is:

1. A winding wedge retention system, comprising:

a rotor having a plurality of rotor poles;

a coil wound on one of said rotor poles;

a V-shaped support wedge positioned between adjacent ones of said rotor poles and adapted to support said coil; and a second wedge having a first surface in contact with said support wedge, a second surface in contact with one of said rotor poles and a third surface in contact with the coil wound on said one of said rotor poles whereby in the presence of varying centrifugal loads said first, second, and third surfaces maintain their respective contact with said support wedge, said rotor pole and said coil so that a uniform gap forms between said coil and its respective rotor pole.

2. The winding wedge retention system of claim 1, wherein said second wedge is positioned radially outwards from said respective coil with respect to a center of said rotor.

3. The winding wedge retention system of claim 1 wherein said second wedge is positioned within a gap defined by an acute angle formed between said respective coil and said rotor pole on which the coil is wound.

4. The winding wedge retention system of claim 1, wherein said second and third surfaces of said second wedge form an acute angle.

5. A winding wedge retention system, comprising:

a rotor having a plurality of rotor poles;

a plurality of coils each wound on a respective one of said rotor poles;

a plurality of V-shaped support wedges positioned between each adjacent pair of rotor poles, said support wedges contacting each of said coils; and a plurality of dove-tail shaped wedges having a first surface in contact with one of said support wedges, a second surface in contact with one of said rotor poles and a third surface in contact with the coil wound on said one of said rotor poles whereby in the presence of varying centrifugal loads said first, second, and third surfaces maintain their respective contact with said support wedge, said rotor pole and said coil so that a uniform gap forms between said coil and its respective rotor pole.

6. The winding wedge retention system of claim 5, wherein each of said dove-tail shaped wedges is positioned radially outwards from the respective adjacent coil with respect to a center of said rotor.

\* \* \* \* \*